Patented Feb. 17, 1953

2,628,985

UNITED STATES PATENT OFFICE 2,628,985

PRODUCTION OF PHENOLS

De Loss E. Winkler, Orinda, and Harry de V. Finch, El Cerrito, Calif., assignors to Shell Development Company, San Francisco, Calif., a corporation of Delaware No Drawing. Application December 5, 1949, Serial No. 131,246

15 Claims. (Cl. 260—621)

This invention relates to a catalytic process for the production of phenols. More particularly, the present invention relates to a process for the production of phenols by catalytic conversion of cycloaliphatic alcohols and cycloaliphatic ketones in the vapor state. In a specific embodiment the invention relates particularly to a catalytic process for the dehydrogenation of cyclohexanone and cyclohexanol to produce phenol.

It already is known that suitable cycloaliphatic alcohols and cycloaliphatic ketones containing a hexatomic cycloaliphatic ring can be converted to phenols by reaction in the vapor phase. A non-catalytic process for pyrolyzing particularly non-aromatic cyclic ketones containing a six-membered cyclo-olefinic ring, e. g., isophorone, has been described in U. S. Patent No. 2,369,196, issued February 13, 1945. It is also known that certain catalysts will favor or promote the dehydrogenation in vapor phase of various cycloaliphatic ketones and of cycloaliphatic alcohols to produce phenols. It is disclosed in U. S. Patent No. 2,369,197, issued February 13, 1945, that certain catalysts comprising activated aluminas will catalyze the conversion of various non-aromatic cyclic ketonic compounds, especially those which already contain at least one double bond, to phenols. There is further described in U. S. Patent No. 2,291,585 a process for producing phenol from cyclohexanol and cyclohexanone over a manganese chromite or copper-manganese chromite dehydrogenation catalyst.

While it thus is known that suitable cycloaliphatic alcohols and cycloaliphatic ketones, wherein the oxy or oxo radical, respectively, is directly linked to a cycloaliphatic hexatomic ring, can be converted to phenolic compounds, the prior art, as well as our investigations of the conversion, show that the nature of the catalyst, if one is employed, is of utmost importance. There is required a catalyst which, in addition to having sufficient activity, in the qualitative sense, has a high degree of selectivity such that the desired over-all reaction is selectively favored to the substantial exclusion of undesired side or secondary reactions. Only a very limited number of materials have been known heretofore to have sufficient catalytic activity and sufficient selectivity to make them practically useful as catalysts for the conversion. Conversely, various materials which have been proposed as the catalyst in other dehydrogenating processes have been found under the reaction conditions to have insufficient catalytic activity and/or selectivity to make them useful as catalysts in a practical scale process for effecting the chemical conversion to which this invention relates. The importance of providing a catalyst having a selective action toward the reaction or reactions that lead to the desired conversion, without excessively promoting undesired side reactions, is due in part to the reactive character of the cycloaliphatic ketones and cycloaliphatic alcohols to be converted to phenols. Likely side reactions which these reactive compounds may undergo, unless there is employed a catalyst having sufficient selectivity, include, dehydration to produce one or more hydrocarbons, with or without attendant resinification of the hydrocarbon; conversion to esters; condensation of the cycloaliphatic alcohol or of the phenol to produce ethers; condensation or polymerization of the cycloaliphatic ketone; cracking or decomposition of one or more of the organic materials to produce primarily products having low molecular weights; conversion of the cyclic compounds to acyclic compounds.

There has been need for and it has been desirable to develop a process for the conversion by dehydrogenation in vapor phase of cycloaliphatic alcohols and cycloaliphatic ketones to produce phenols, in order that other materials may be employed as the catalyst, and the process improved in other respects as will be apparent from the description that follows:

It now has been discovered in accordance with the present invention that, the conversion of cycloaliphatic alcohols and cycloaliphatic ketones by dehydrogenation of the same or mixtures thereof to produce phenols can be attained in the presence of certain other materials than those heretofore known as catalysts for the conversion, and that the new process thus provided has advantages which make it at least equal to and in some respects superior to the processes heretofore known. It has been found that the materials that are used as the catalyst in the new process of the invention not only have a surprisingly high degree of selectivity toward the desired reaction, which means that their use as the catalyst favors formation of the desired phenolic product in very high yields and the formation of any undesired by-products in only low or negligible yields, but that they also are characterized by the advantage with respect to the prior art catalysts that they may be used in the process continuously over prolonged or extensive periods of time without need for treatment for reactivation or regeneration, or replacement.

The catalysts which are employed in accordance with the process of the present invention, and by which the process is in part characterized, are catalysts of the iron oxide type which essentially comprise a major mole amount of iron oxide and a minor mole amount of an alkaline compound of an alkali or alkaline earth metal. We have observed in the course of our investigations, that iron oxide alone, while perhaps capable of causing low conversions of, for example, cyclohexanone to phenol, is in general unsuited for use as the catalyst in a process directed to this end because of the low selectivity as well as the low activity. Likewise, alkaline compounds of alkali and alkaline earth metals are in themselves not suited to use as catalysts in such a process. We have now discovered that catalyst masses essentially comprising a major mole amount of iron oxide and a minor mole amount of an alkaline compound of an element of the alkali metal and alkaline earth metal groups of the periodic system of the elements are surprisingly selective in their action upon cycloaliphatic alcohols and cycloaliphatic ketones of the herein-defined class, such that high yields of desired phenolic compounds may be attained by employing these catalyst masses in the conversion process. The content of the alkaline compound in the catalysts which are employed in accordance with the invention, expressed in terms of the oxide of the particular alkali metal or alkaline earth metal and based upon the amount of iron oxide calculated as $Fe_2O_3$, ordinarily will be at least about 0.2 mole per cent. Larger amounts of the alkaline compound, preferably from about 0.5 to about 5 mole per cent, advantageously may be present, while in the other extreme as much as 100 mole per cent of the alkaline compound, calculated on the same basis, may be present. Although alkaline compounds of any of the various alkali metals and alkaline earth metals may be present, e. g., of sodium, potassium, lithium, rubidium, caesium, calcium, strontium, etc., the best catalysts for use in the process of the present invention appear to be those which contain a compound of an alkali metal, particularly a potassium compound such as the carbonate, the oxide, the hydroxide, etc.

The catalysts which are used in the present novel process for converting cycloaliphatic ketones and cycloaliphatic alcohols to desired phenolic compounds are referred to as essentially comprising iron oxide and the alkaline compound. Minor amounts of difficultly reducible oxides of metals, e. g., of chromium, manganese, bismuth, titanium, zirconium, etc., may also be present. In fact, a particularly effective catalyst has been found to be one consisting essentially of iron oxide in major amount on a mole basis, a minor mole amount of an alkaline compound of potassium and a minor mole amount of chromium oxide, the alkaline compound of potassium preferably being present in a greater mole amount than the chromium oxide. When the catalysts that are used according to the invention contain such a third component or oxide they desirably will be prepared under conditions or in a manner such that the third component is present primarily in admixture with the other components of the catalyst mass rather than predominantly in chemical combination therewith. That is to say, while the difficultly reducible oxide, e. g., chromium oxide, may be present as a solid solution in and with the iron oxide, or simply in intimate admixture (as distinct from solution) therewith, its presence in combined form, for example as the chromite, will be distinguished from such simple admixtures. The catalysts should be devoid or substantially so of compounds which react with iron oxide to form inactive materials under the conditions of either preparation or use. For this reason the presence of substantial portions of, for example, magnesia, alumina, or the like, preferably is avoided. Wholly inert materials may be present as supports or carriers for the catalyst mass or the catalyst may be used in the form of pellets, fragments, powders, dusts, or other conventional forms without a supporting or carrying material.

Catalyst masses suited to the objects of the invention may be prepared, for example, by mixing a small amount of a basic oxide, such as potassium oxide, with molten iron in the presence of oxygen or with molten iron oxide, and cooling and breaking up the resulting mass according to the procedure described in U. S. Patent No. 1,489,497, issued April 8, 1924. The preferred catalyst is an alkylized iron oxide catalyst comprising a minor mole amount of an alkaline compound of potassium and a minor mole amount of at least one mole per cent of chromium oxide, which has been calcined at a temperature between about 700° C. and 1000° C. in an atmosphere under which no appreciable formation of iron chromite takes place for sufficient time to decrease the available surface of the catalyst to below 30 square meters per gram. Catalysts of this preferred type are prepared according to the disclosure of U. S. Patent No. 2,408,140 issued September 24, 1946, to which reference is hereby made. Alkalized iron oxide catalysts having a high alkali content and which may be employed in accordance with the present invention are prepared according to the disclosures contained in U. S. Patent No. 2,414,585 issued January 21, 1947, to which reference also is made.

The process of the invention ordinarily will be carried out in a continuous manner by passing a gaseous stream of the cycloaliphatic alcohol or cycloaliphatic ketone or mixtures thereof into contact with the catalyst positioned in a suitable reaction zone. While the reaction temperature may be varied within reason, it is preferred to employ temperatures within the range from about 350° C. to about 650° C., temperatures within the range of from about 450° C. to about 600° C. being especially preferred. It is desirable to have present with the cycloaliphatic alcohol or cycloaliphatic ketone to be converted, a minor proportion of water, and thus to contact with the catalyst a mixture of water and cycloaliphatic alcohol and/or cycloaliphatic ketone. Mole ratios between the water and the organic reactant of from 1 to 50 may be used, a preferred range being from 2 to 15, expressed as the numerical value for the ratio (moles $H_2O$)/(moles cycloaliphatic alcohol and/or cycloaliphatic ketone). The water may be mixed with the organic reactant in any convenient manner; for example, by vaporizing a previously prepared mixture, by separately vaporizing the water and organic reactant and mixing streams of the vapors, or in other convenient manner.

When, as is preferred, the process is carried out continuously, the catalyst may be positioned in a suitably heated reaction zone such as one or more reaction tubes constructed of glass, iron, stainless steel, or a ceramic or other suitable material and a gaseous stream of the cycloaliphatic alcohol, cycloaliphatic ketone or mixture thereof, preferably containing water in the above-stated amounts, passed therethrough.

The rate of flow to be used will be determined in part by the particular other operating conditions to be used and in part by the particular organic material that is to be converted. In general, a liquid hourly space velocity (which is a convenient measure of rate of flow and is expressed in terms of the total volume of the feed when measured in liquid state that is contacted in gaseous state with a unit volume of the catalyst per hour) of from about 0.5 hr.$^{-1}$ to about 10 hr.$^{-1}$ may be used, a preferred range being from about 1 hr.$^{-1}$ to about 5 hrs.$^{-1}$. The gaseous effluent from the reaction zone may be treated in any suitable manner to recover the desired phenolic product, various suitable methods being known. Unconverted cycloaliphatic alcohol and/or cycloaliphatic ketone may be recovered and recycled. Ordinarily, fractional condensation of the gaseous effluent or fractional distillation of the condensed effluent will afford a convenient method of recovery. When, for example, phenol is prepared by conversion of cyclohexanone, if the percentage of conversion of cyclohexanone to phenol is such that there is produced an amount of phenol greater than that that is required to form the azeotropic mixture with any unreacted cyclohexanone that may be present, the condensed gaseous effluent may be fractionally distilled to directly recover this excess amount of phenol, and the cyclohexanone-phenol azeotrope which also may be separated during the distillation may be recycled through the process. In the event that less phenol is produced than is required for formation of the azeotropic mixture with any unreacted cyclohexanone in the gaseous effluent, the condensed reactor effluent may be distilled in the presence of an agent such as a non-vicinal glycol, e. g., 1,4-butenediol, to assist in the separation of the phenol from unreacted cyclohexanone. See, for example, U. S. Patent No. 2,265,939.

The following examples will illustrate the process of the invention. It is to be appreciated that the examples are not intended to be limitations upon the invention as it is defined in the hereto appended claims.

EXAMPLE I

The catalyst which was employed in this experiment was an alkalized iron oxide catalyst containing 88% by weight of iron oxide (expressed as $Fe_2O_3$), 9.5% of potassium oxide and 2.5% of chromium oxide. The catalyst was prepared by mixing finely-ground ferric oxide, potassium carbonate and chromium oxide in the form of a moist paste, pelleting the paste and calcining the dried pellets at about 900° C. for 12 hours, thereby reducing the available surface to below 30 square meters per gram. Prior to use, the catalyst was treated with a 5/1 mole mixture of water and hydrogen at 600° C. for about 2 hours, the reduction treatment serving to convert the ferric oxide mainly to the ferroso ferric oxide ($Fe_3O_4$), or the magnetic iron oxide. During the experiments described in this and the subsequent examples, the oxidation level of the catalyst during the actual runs was thereafter determined by the equilibrium conditions which exist between the various oxides of iron and the gaseous reaction mixture in contact with the catalyst. From visual inspection it appeared that the catalysts comprised largely the magnetic oxide of iron. The prior reduction treatment described in this example, therefore, assisted in the attaining of the equilibrium. As will be appreciated, there could have been employed instead a reduction treatment effected by contacting the reaction mixture to be used with the catalyst for a time sufficient to bring the catalyst to the desired equilibrium state. In this example the feed to the reactor consisted of cyclohexanone and water present in amounts corresponding to a mole ratio of water/cyclohexanone equal to 9.3. The gaseous feed was passed into contact with the catalyst positioned in a heated reaction tube at a liquid hourly space velocity of 1.3 hr.$^{-1}$ and at a temperature of 550° C. The gaseous effluent from the reactor was condensed and fractionally distilled. Analyses of the products showed that phenol was obtained in a yield of 80% based on the amount of the cyclohexanone consumed.

EXAMPLE II

The catalyst employed in this example was prepared in the same manner as the catalyst used in Example I. A mixture of cyclohexanone and water present in amounts corresponding to a mole ratio water/cyclohexanone equal to 5.2 was passed over the catalyst at a liquid hourly space velocity of 1.2 hr.$^{-1}$ and a temperature of 550° C. The yield of phenol corresponded to 80% based upon the amount of cyclohexanone consumed.

EXAMPLE III

In this example there is employed an alkalized iron oxide catalyst containing chromium oxide prepared according to the method described in Example I. A gaseous mixture of cyclohexanone and water was passed over the catalyst at a liquid hourly space velocity of 1.4 hrs.$^{-1}$ and a temperature of 550° C. The duration of the run was 16 hours. During the run the composition of the feed was maintained within the limits of from 10.5 to 10.9 for the mole ratio $H_2O$/cyclohexanone. The products from the reactor were collected separately over 4-hour intervals and the four portions thus obtained were distilled for recovery of phenol. Each of the portions thus collected contained an amount of phenol corresponding to an 82–86% yield based upon the amount of cyclohexanone consumed.

EXAMPLE IV

This example shows three runs which were carried out to determine the effect of temperature upon the selectivity of the process conducted over the alkalized iron oxide catalyst prepared according to the method described in Example I. The example consists of three runs carried out at a water/cyclohexanone mole ratio of about 2.0 and a flow rate corresponding to a liquid hourly space velocity of 1.2 hrs.$^{-1}$. The temperature used in the individual runs was as shown in the following table. The products from each run were collected separately and the amount of phenol was determined. The results of the runs, expressed in terms of the yield of phenol based upon the amount of cyclohexanone consumed, are also shown in the following table. The results indicate that for this catalyst and the other reaction conditions, a temperature of about 550° C. is optimum.

*Table*

| Temperature, °C. | Yield of Phenol, Percent |
|---|---|
| 500 | 73 |
| 550 | 82 |
| 575 | 70 |

EXAMPLE V 3,5-xylenol was prepared by conversion of isophorone (3,3,5-trimethyl-5-cyclohexene-1-one) over an alkalized iron oxide catalyst containing chromium oxide, prepared according to the method described in Example I. A gaseous mixture of isophorone and water present in a mole ratio H₂O/isophorone equal to 14 was employed as the feed. The feed rate was equal to a liquid hourly space velocity of 7.1. The reaction temperature was 625° C. In this experiment the yield of 3,5-xylenol based upon the amount of isophorone consumed was about 50%. The somewhat lower yield obtained in this experiment indicates that in all likelihood the temperature used was somewhat above the optimum.

While the process of the invention has been illustrated in the examples by the specific conversion of cyclohexanone to phenol and isophorone to 3,5-xylenol, the process can be more generally applied to the conversion of cycloaliphatic alcohols and cycloaliphatic ketones and mixtures of the same, to valuable and useful phenolic compounds. The cycloaliphatic alcohols and cycloaliphatic ketones which can be converted according to the process of the invention are preferably monocyclic cycloaliphatic alcohols and ketones which contain a six-membered cycloaliphatic ring having the alcoholic hydroxyl radical or the carbonylic oxo radical, respectively, directly bonded to a carbon atom which forms a part of said cycloaliphatic ring. As shown in the examples, the cycloaliphatic alcohol or cycloaliphatic ketone may be one in which the ring is fully saturated or it may be one in which the ring may already be partially dehydrogenated, i. e., may contain one or more olefinic bonds. Suitable cycloaliphatic ketones preferably will contain at least one hydrogen atom directly bonded to a carbon atom adjacent to the nuclear carbonylic carbon atom. The preferred compounds are unsubstituted on the nucleus or cycloaliphatic ring (other than by the hydroxyl or oxo radical), although, as shown in the examples, substituted cycloaliphatic alcohols and cycloaliphatic ketones may also be used. Substituents which may be present on the cycloaliphatic ring are represented particularly by alkyl radicals, such as lower alkyl radicals containing from 1 to 8 carbon atoms. The isophorones, which are 3,5,5-trialkyl cyclo-olefinic ketones having six carbon atoms in the ring are representative of a readily obtainable class of cycloaliphatic ketones which may be converted to phenols according to the invention. In addition to isophorone, this group includes 3,3,5-triethyl-5-cyclohexene-1-one, 3,3,5-tripropylcyclohexene-1-one, 5-cyclohexene-1-one, 3,3-diethyl-5-methyl-5-cyclohexene-1-one, 3-methyl-3-ethyl-5-ethyl-5-cyclohexene-1-one, 3,3,5-tributyl-5-cyclohexene-1-one, 3,3-dimethyl-5-pentyl-5-cyclohexene-1-one, 3,3-dibutyl-5-pentyl-5-cyclohexene-1-one, 3,3,5-trihexyl-5-cyclohexene-1-one, and their various homologs and analogs. Partially or completely hydrogenated (saturated) derivatives of the isophorones may also be employed in accordance with the invention. These partially or completely hydrogenated derivatives include, for example, the corresponding unsaturated alcohols, such as 3,3,5-trimethyl-5-cyclohexene-1-ol, 3,3,5-tripropylcyclohexene-1-ol, 5-cyclohexene-1-ol, 3,3-diethyl-5-methyl-5-cyclohexene-1-ol, 3-methyl-3-ethyl-5-ethyl-5-cyclohexene-1-ol, 3,3,5-tributyl-5-cyclohexene-1-ol, 3,3-dimethyl-5-pentyl-5-cyclohexene-1-ol, 3,3-dibutyl-5-pentyl-5-cyclohexene-1-ol, 3,3,5-trihexyl-5-cyclohexene-1-ol, and their various homologs and analogs; the corresponding saturated ketones such as 3,3,5-triethylcyclohexane-1-one, 3,3,5-tripropylcyclohexane-1-one, cyclohexanone, 3,3-diethyl-5-methylcyclohexane-1-one, 3-methyl-3-ethyl-5-ethylcyclohexane-1-one, 3,3,5-tributylcyclohexane-1-one, 3,3-dimethyl-5-pentylcyclohexane-1-one, 3,3-dibutyl-5-pentylcyclohexane-1-one, 3,3,5-trihexylcyclohexane-1-one, and their various homologs and analogs; and the corresponding saturated alcohols such as, 3,3,5-triethylcyclohexan-1-ol, 3,3,5-tripropylcyclohexan-1-ol, 5-cyclohexan-1-ol, 3,3-diethyl-5-methylcyclohexan-1-ol, 3-methyl-3-ethyl-5-ethylcyclohexan-1-ol, 3,3,5-tributylcyclohexan-1-ol, 3,3-dimethyl-5-pentylcyclohexan-1-ol, 3,3-dibutyl-5-pentylcyclohexan-1-ol, 3,3,5-trihexylcyclohexan-1-ol, and their various homologs and analogs. In general it may be stated that the cycloaliphatic alcohols and cycloaliphatic ketones which can be applied in the process of the invention comprise a single, hexatomic cycloaliphatic ring to which the hydroxy or oxo radical, respectively, is directly bonded, the molecule being composed of atoms of carbon, hydrogen and oxygen only and, in a preferred case, containing from 6 to 20 carbon atoms. The process of the invention is especially suited to the preparation of phenols from cyclohexanone, cyclohexanol, and mixtures of the same, and from isophorone and its various homologs and analogs.

We claim as our invention:

1. In a process for producing phenol by converting cyclohexanone, the improvement which resides in passing a gaseous mixture of cyclohexanone and water into contact at a temperature within the range of from about 350° C. to about 650° C. with a catalyst consisting essentially of a major mole amount of iron oxide, a minor mole amount of an alkaline compound of potassium and a minor mole amount of chromium oxide, the catalyst having been previously calcined at a temperature between about 800° C. and about 950° C. in an atmosphere under which no appreciable formation of iron chromite takes place and for a sufficient length of time to decrease the available surface of the catalyst to below 30 square meters per gram.

2. A process according to claim 1 in which the catalyst contains a mole excess of the potassium compound, calculated as K₂O, with respect to the chromium oxide.

3. In a process for the production of phenols by conversion of cycloaliphatic ketones wherein the carbonyl carbon atom is a member of a hexatomic cycloaliphatic ring, the improvement which resides in effecting the conversion by contacting a gaseous mixture of the cycloaliphatic ketone and water at a temperature within the range of from about 350° C. to about 650° C. with a catalyst consisting essentially of a major mole amount of iron oxide, a minor mole amount of an alkaline compound of potassium and a minor mole amount of chromium oxide, the catalyst having been previously calcined at a temperature between about 800° C. and about 950° C. in an atmosphere under which no appreciable formation of iron chromite takes place and for a sufficient length of time to decrease the available surface of the catalyst to below 30 square meters per gram.

4. A process according to claim 3 in which the catalyst contains a mole excess of the potassium compound, calculated as K₂O, with respect to the chromium oxide.

5. In a process for the production of phenol by conversion of a member of the class consisting of cyclohexanone, cyclohexanol and mixtures of the same, the improvement which resides in effecting the conversion by contacting a member of said class with a catalyst mass essentially comprising a major mole amount of iron oxide and a minor mole amount of an alkaline compound of potassium at a temperature of from about 350° C. to about 650° C.

6. In a process for the production of phenol by conversion of cyclohexanol, the improvement which resides in contacting cyclohexanol with a catalyst mass essentially comprising a major mole amount of iron oxide and a minor mole amount of a compound of potassium at a temperature within the range of from about 350° C. to about 650° C.

7. A process for the production of phenol which comprises passing a gaseous mixture comprising steam and a member of the class consisting of cyclohexanone, cyclohexanol and mixtures of the same, into contact at a dehydrogenating temperature with a catalyst consisting essentially of a major mole amount of iron oxide, a minor mole amount of an alkaline compound of potassium and a minor mole amount of chromium oxide.

8. In a process for the production of 3,5-xylenol by conversion of isophorone, the improvement which resides in passing a gaseous mixture of isophorone and water into contact at a temperature within the range of from about 350° C. to about 650° C. with a catalyst consisting essentially of a major mole amount of iron oxide, a minor mole amount of an alkaline compound of potassium and a minor mole amount of chromium oxide, the catalyst having been previously calcined at a temperature between about 800° C. and about 950° C. in an atmosphere under which no appreciable formation of iron chromite takes place and for a sufficient length of time to decrease the available surface of the catalyst to below 30 square meters per gram.

9. A process according to claim 8 in which the catalyst contains a mole excess of the potassium compound, calculated as $K_2O$, with respect to the chromium oxide.

10. The process for the production of 3,5-xylenol which comprises contacting a mixture of isophorone and water at a dehydrogenating temperature with a catalyst mass consisting essentially of a major mole amount of iron oxide, a minor mole amount of an alkaline compound of potassium and a minor mole amount of chromium oxide.

11. A process for the production of a phenol which comprises contacting a mixture comprising isophorone as the only reactant at a dehydrogenating temperature with a catalyst mass essentially comprising a major mole amount of iron oxide and a minor mole amount of an alkaline compound of potassium.

12. In a process for the production of a phenol by conversion of a cycloaliphatic compound of the class consisting of cycloaliphatic alcohols and cycloaliphatic ketones, having the oxy and the oxo radicals, respectively, directly linked to a hexatomic cycloaliphatic ring, the improvement which resides in effecting the conversion by contacting at a dehydrogenating temperature said cycloaliphatic compound with a catalyst consisting essentially of a major mole amount of ferroso ferric oxide, a minor mole amount of an alkaline compound of potassium and a minor mole amount of chromium oxide, the catalyst having been previously calcined at a temperature between about 800° C. and about 950° C. in an atmosphere under which no appreciable formation of iorn chromite takes place and for a sufficient length of time to decrease the available surface of the catalyst to below 30 square meters per gram.

13. A process according to claim 12 in which the catalyst contains a mole excess of the potassium compound, calculated as $K_2O$, with respect to the chromium oxide.

14. In a process for the production of a phenol by conversion of a cycloaliphatic compound of the class consisting of cycloaliphatic alcohols and cycloaliphatic ketones, having the oxy and the oxo radicals, respectively, directly linked to a hexatomic cycloaliphatic ring, the improvement which resides in effecting the conversion by contacting said cycloaliphatic compound with a catalyst essentially comprising a major mole amount of iron oxide and a minor mole amount of an alkaline compound of an element of the alkali metal and alkaline earth metal groups of the periodic table.

15. In a process for the production of phenol by the conversion of a member of the class consisting of cyclohexanone, cyclohexanol and mixtures thereof, the improvement which resides in effecting the conversion by contacting at a dehydrogenating temperature a member of said class with a catalyst essentially comprising a major mole amount of iron oxide and a minor mole amount of an alkaline compound of an element of the alkali metal and alkaline earth metal groups of the periodic table.

DE LOSS E. WINKLER.
HARRY DE V. FINCH.

REFERENCES CITED

The following references are of record in the file of this patent:

UNITED STATES PATENTS

| Number | Name | Date |
| --- | --- | --- |
| 2,408,140 | Gutzeit | Sept. 24, 1946 |
| 2,413,598 | Ballard et al. | Dec. 31, 1946 |
| 2,426,829 | Kearby | Sept. 2, 1947 |
| 2,503,641 | Taylor et al. | Apr. 11, 1950 |